United States Patent [19]
Weinstein

[11] 3,733,434
[45] May 15, 1973

[54] TIME DISCRIMINATOR CIRCUIT FOR EDGE TRACKING TARGET CONTOURS

[75] Inventor: Myron Weinstein, Munroe Falls, Ohio

[73] Assignee: Goodyear Aerospace Corporation, Akron, Ohio

[22] Filed: June 1, 1970

[21] Appl. No.: 42,185

[52] U.S. Cl.........178/6.8, 178/DIG. 21, 250/203 CT
[51] Int. Cl...............................................H04n 1/38
[58] Field of Search.......................178/DIG. 21, 6.8; 250/203 CT

[56] References Cited

UNITED STATES PATENTS

| | | | |
|---|---|---|---|
| 2,774,964 | 12/1956 | Baker | 178/6.8 |
| 2,917,737 | 12/1959 | Close et al. | 178/DIG. 21 |
| 2,970,187 | 1/1961 | Hinton | 178/DIG. 21 |
| 3,320,360 | 5/1967 | Thompson | 178/DIG. 21 |
| 3,257,505 | 6/1966 | Van Wechel | 178/DIG. 21 |
| 3,518,368 | 6/1970 | Olson | 178/DIG. 21 |
| 3,541,246 | 11/1970 | Goldfischer | 178/6.8 |

*Primary Examiner*—Robert L. Griffin
*Assistant Examiner*—Joseph A. Orsino, Jr.
*Attorney*—J. G. Pere and L. A. Germain

[57] ABSTRACT

The invention relates to a circuit utilizing a television signal to track the edges of an object, (hereinafter called the target) to provide position and guidance information. The object may be standing still or moving and the television camera with tracking circuitry may be standing still or moving. The unique feature is in the ability to track a contour to one or both sides of the target so as to enable tracking to cover irregular targets with better resolution, and without tracking loss. The absolute position of the target edge is tracked and is updated on each line of TV video that crosses the target edge.

4 Claims, 5 Drawing Figures

INVENTOR
MYRON WEINSTEIN

BY:
Oldham & Oldham
ATTORNEYS

TIME DISCRIMINATOR CIRCUIT FOR EDGE TRACKING TARGET CONTOURS

Normally in target tracking systems, and particularly centroid trackers, synthetic error signals or gates are used and then averaged in time discriminators to achieve tracking coordination. This limits the tracker to tracking straight edges or any straight portion of an edge of the target, and because of such limit, makes tracking resolution and permanent reliable lock-on extremely difficult.

Therefore, it is the general object of the invention to avoid and overcome the foregoing and other difficulties of prior art practices by providing a tracking system which is able to track contours in targets, and particularly contours on the edges thereof in a centroid tracking system to allow more horizontal motion to be tolerated while maintaining tracking because the gate for each line crossing the target can center itself on the target edge signal.

A further object of the invention is to provide a very simple, and yet highly reliable adjustment in the electronic circuitry in a target tracking system to permit tracking edge contours to enable greater tolerance in horizontal motion to be allowed.

For a better understanding of the invention reference should be had to the accompanying drawings wherein.

Three typical applications are as follows:

1. This system could be used in a production machine operation where it is desired to accurately position one item over the center of another item as would be required for dropping one item A into the hole of another item B with item A automatically fed and item B on a moving conveyor belt.

2. The telecasting of sporting events, football, baseball, etc. often requires the television camera to follow a person or object in motion while keeping the object centered in the television raster, sometimes while zooming the lens. This invention would have application to this problem.

3. In directing a missile or bomb to a target this invention provides the required angular pitch and yaw signals needed to direct the missile control system towards the center of the target.

FUNCTIONAL DESCRIPTION

Figure 1:
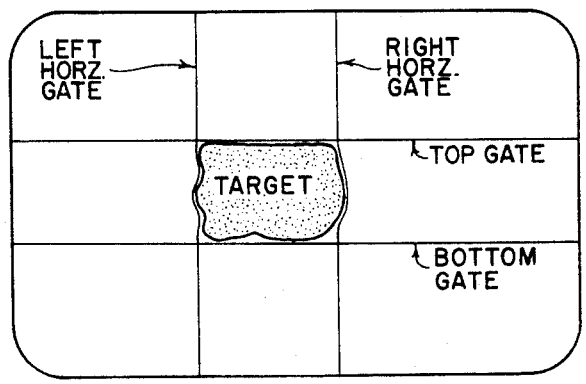
FIG. 1 is an illustration of the centroid tracking gating arrangement.

The invention is particularly related to a centroid tracking technique with this more particularly illustrated in FIG. 1 of the drawings, which illustrates that the expanding gate tracking logic utilizes four window gates which are locked onto the left, right, top and bottom edges of the target to achieve centroid tracking. The gating configuration illustrated in FIG. 1 shows the total configuration with all window gates locked onto their respective edges. What should be noted is the way in which the left and right gates follow the absolute position of the target edges whereas the top and bottom gates follow only straight line approximations of the target edges. The system provides better centroid tracking information and permits more horizontal motion to be tolerated while maintaining tracking because the gate for each line crossing the target can center itself on the target edge signal.

CIRCUIT IMPLEMENTATION

The essence of the invention lies in a sample and hold circuit which cooperates with the remainder of the system to update target edge information for each pass of the video input signal.

Figure 5:
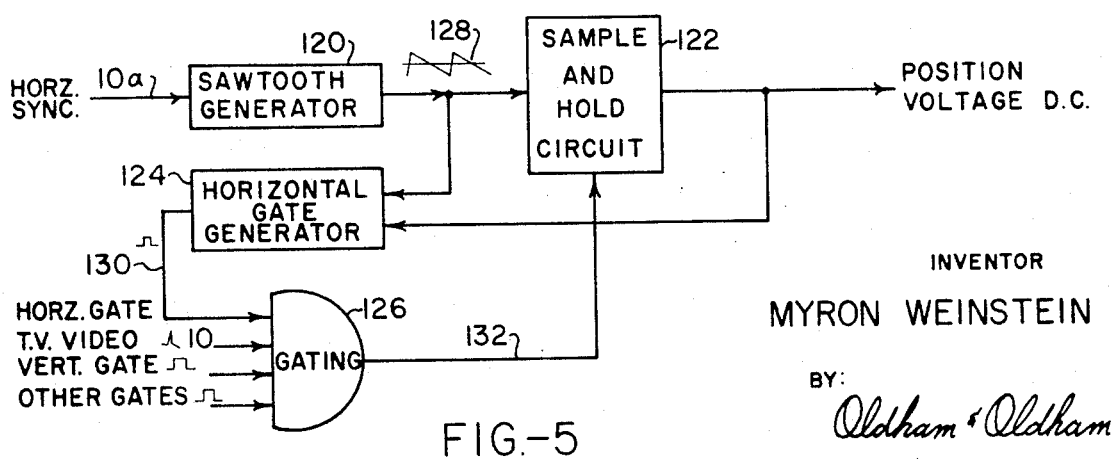
FIG. 5 is a more general schematic block diagram of the particular circuitry utilized to achieve the contoured edge tracking feature of the invention.
Figure 2:
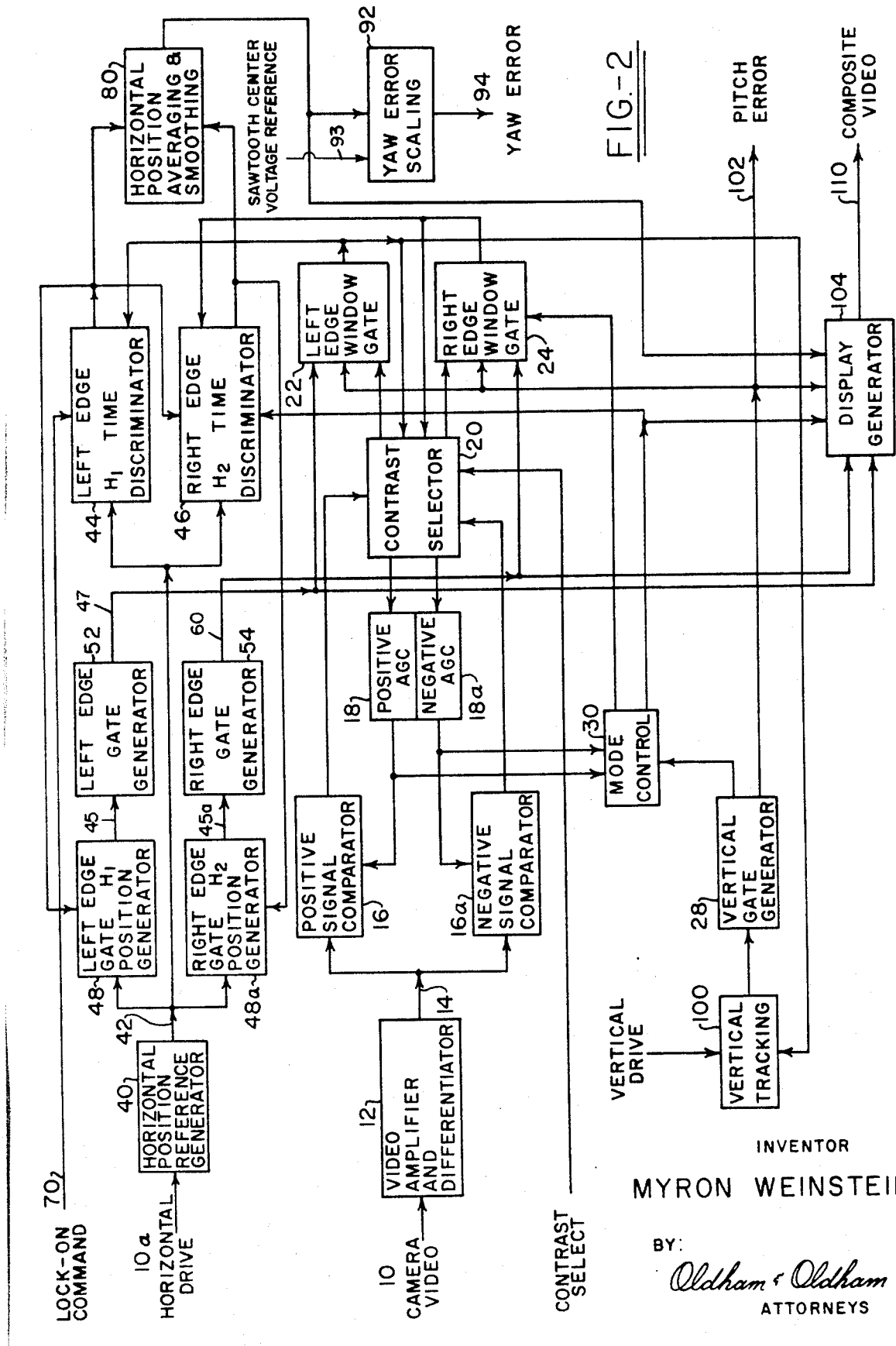
FIG. 2 is a block diagram schematic of the overall system.

FIG. 5 illustrates in general block diagram form this circuit. Specifically, it comprises a sawtooth generator 120, a sample and hold circuit 122, a horizontal gate generator 124, and a gating network 126. A horizontal sync input signal 10a coordinated with a TV video input signal 10 is converted by generator 120 to a sawtooth waveform 128 which feeds as an input to circuit 122. The waveform 128 also is an input to generator 124 as is the output signal from circuit 122. Hence, generator 124 produces a horizontal gate 130 which feeds as an input to the network 126. The gating output 132 is the second input to the circuit 122.

This circuit uses tracking voltages within itself that are scaled one to one. No synthetic error signals or gates are used and then averaged as is done in most time discriminators. The absolute position of the target edge is tracked and is updated on each line of TV video that crosses the target edge. Because the very same sawtooth signal is sampled by the video and fed into the generator 124, small or moderate changes in the sawtooth itself have no effect on the tracking.

In the instant application two similar circuits are used, one for the left target edge and one for the right. These in effect track the edge contours and when used in conjunction with a conventional vertical gate to track top and bottom of the target, a centroid guidance signal results.

SPECIFIC SYSTEM DISCUSSION

Video Processing

Figure 3:
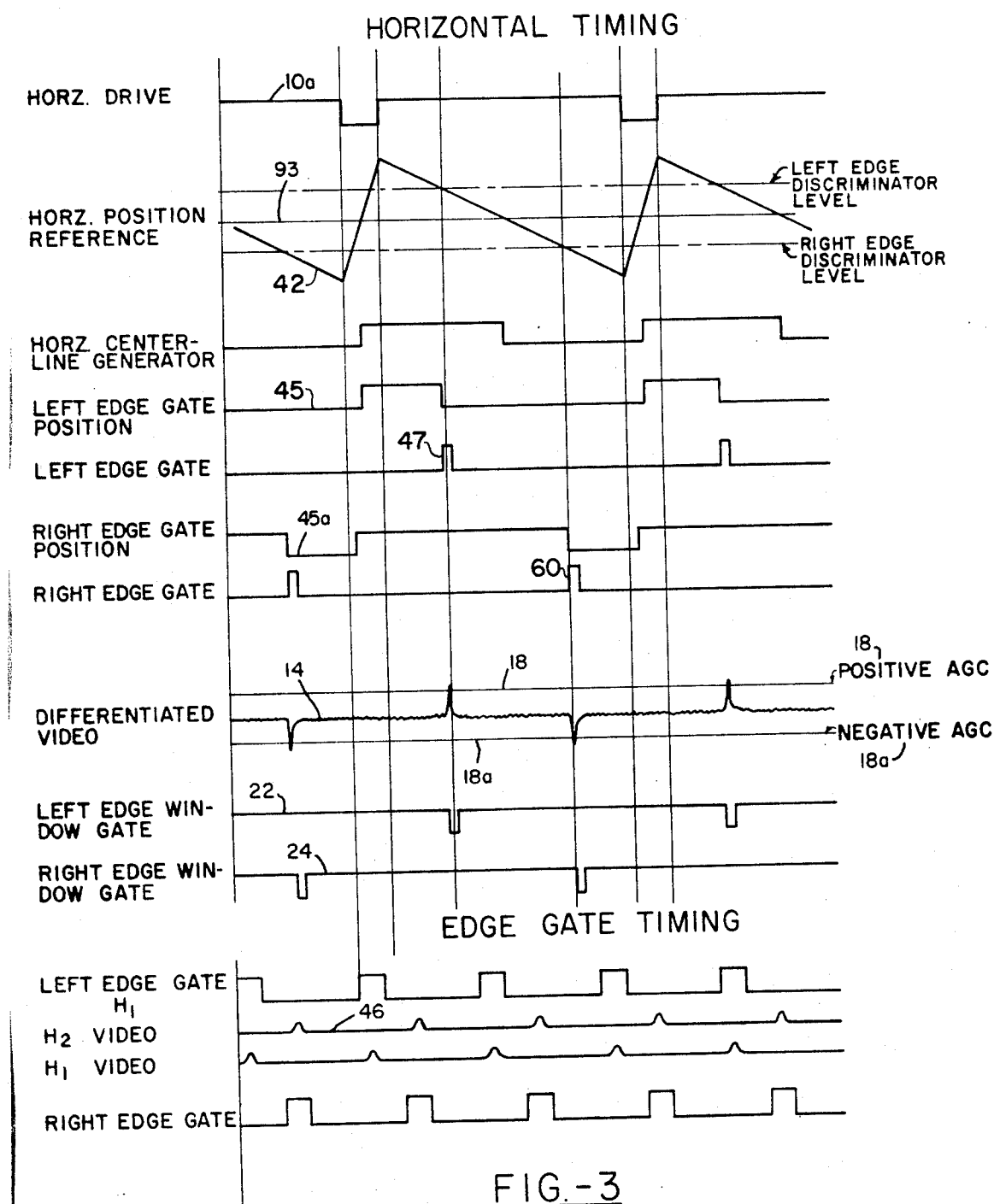
FIG. 3 is a graphic illustration of the waveforms generated by the system of FIG. 2.

The camera video input signal 10 is amplified and differentiated as the first step of video processing in block 12. The resulting output which is signal 14 of FIG. 3 is divided into left edge signals and right edge signals based on target contrast. A positive signal comparator 16 detects the presence of positive polarity signals of signal 14, above the threshold of positive AGC 18, and amplifies only these signals.

A contrast select control 20 provides selection of the routing of these signals to the correct window gating areas 22 and 24, respectively. Thus the manual selection by the operator allows only left edge signals which are positive in the example of the signal 14 in FIG. 3 to take part in the left edge window gating section 22. Likewise, only right edge signals are routed for use in the right edge window gating section 24. The gate 22 passes only the differentiated video lying within the aperture formed by the coincidence of the left edge gate 47 and a vertical gate generator 28 receiving an input from a vertical tracking section 100.

The right edge window gating 24 is similar to the left, except a search gate signal from a mode control section 30 is used in lieu of the right edge gate signal from the contrast selector 20 prior to right gate lockon. This occurs with direction from control section 30, after which the right edge signals are accepted in the area bounded by the right edge gate 60 and vertical gate generator 28.

The window gated left and right edge signals from sections 22 and 24 are routed via the contrast selection 20 to the proper positive or negative AGC circuits 18 and 18a. For a light target on a darker background, the left edged AGC level would be positive and the right negative as illustrated in FIG. 3. The reverse would be true for a dark target on a lighter background.

Horizontal Tracking

The horizontal drive indicated by numeral 10a which also comes from the TV camera is used to generate a horizontal position reference signal by circuit 40 which is a sawtooth signal 42, as seen in FIG. 3. This reference signal 42 is sampled and held in a left edge H1 time discriminator 44 in accordance with a signal from the left edge window gate section 22 to provide the position waveform 45 from left edge position generator 48 indicated in FIG. 3. The left edge gate position generator 48 is a comparator circuit which produces an output gate edge when the reference sawtooth signal crosses the DC level resulting from the H1 time discriminator. Note that the left edge gate pulse 47 is produced at the trailing edge of the position waveform.

The right edge gate signal 60 is generated in a similar manner using the same sawtooth reference from block 40, and the right edge H2 time discriminator 46. FIG. 3 shows the relation of the two separate output levels of the samples and hold discriminators 44 and 46 to their respective left and right gate positions.

The left edge time discriminator 44 has two input signals, the horizontal position reference from block 40 and the video pulse resultant from a left edge window gating generator 48 acting through window gate 22. In addition, a lockon command 70 is used to switch the discriminator 44 from a fixed reference output to the active tracking output. The signal 70 is a control signal initiated manually or automatically from a control panel (not shown). The discriminator 44 uses the video pulse for sampling the sawtooth reference waveform from section 40. The output level of the discriminator 44 is then equal to the voltage value of the sawtooth at the time position of the video pulse. This sample and hold method is used for tracking the changing position of the target edge by updating the output of the discriminator 44 with each new edge pulse. The position tracking loop is completed by feeding the output of the discriminator 44 back to the left edge gate position generator 48. This continuous updating on each video target pulse allows tracking the target edge contour on a line by line basis.

Figure 4:
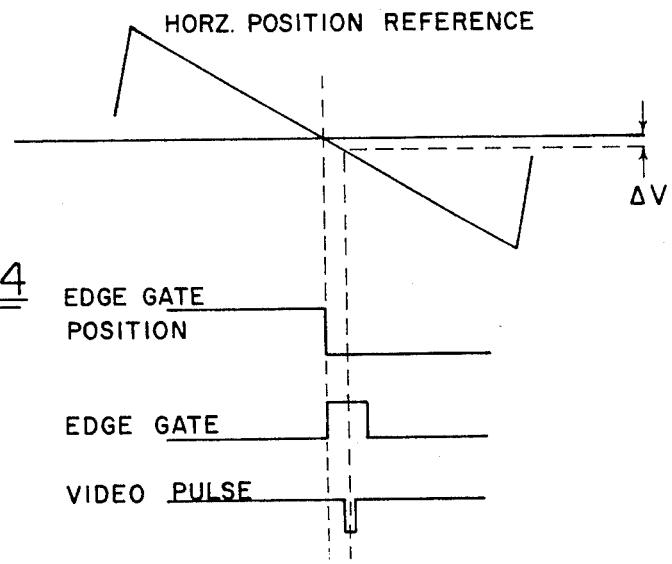
FIG. 4 is a graphic illustration of the gating pulse and its relationship to the tracking signal.

A more detailed look at the time discriminator timing (applicable to both left edge and right edge discriminators 44 and 46) is illustrated in FIG. 4. For optimum tracking, it is desirable to position edge gate generators 52 and 54, respectively, so that the video pulse is centered within it as shown in FIG. 4. When the video pulse samples the sawtooth signal, the resulting output level appears to be off by the amount $\Delta V$. An offset level is added to the discriminator 44 to supply this fixed $\Delta V$ and to center the gate on the video pulse. This offset level is added by means of circuit components in discriminator 44 as well understood by those skilled in the art.

The right edge time discriminator 46 functions in a manner similar to discriminator 44. However, its output is determined by the mode control section 30. Prior to right gate lockon the output of discriminator 46 is held identical to the output of discriminator 44. When the mode control 30 initiates right edge lockon (in addition to the established left edge tracking), the output from discriminator 46 changes from the same as output from discriminator 44 to the sample and hold tracking output.

To compute the yaw error signal and to generate the yaw display centerline, a signal corresponding to the average position of (or center position between) the left and right tracking gates is required. (Note that before right gate lockon this would merely correspond to the left gate position). In order to avoid step discontinuities in the output error signal to the flight control, the average signal is filtered. The filtering is varied in block 80 to accommodate the relatively large discontinuity introduced with right gate lockon as compared to those encountered in normal tracking. A yaw error scaling section 92 is provided to compare the signal from block 80 to the center sawtooth reference signal 93 to produce a yaw error signal 94 operating around zero volts, and to amplify the error signal 94. A typical way known by those skilled in the art to shift level to operate about zero volts is by use of a preselected center reference signal 93 input to section 92.

Vertical Tracking

The vertical drive operates in a vertical tracking section 100 and utilizes an input from the camera video passing through the left edge window gating circuit 22. Thus, the vertical tracking is done with respect to the vertical height of the left edge of the target using conventional error discriminator techniques. The section 100 can operate in any conventional manner known to those skilled in the art to produce a vertical tracking pitch error 102. Input is also provided to the mode control 30, as well as cooperating with a display generator 104, to produce a composite video signal 110 similar to that shown in FIG. 1. These last functions are well known to those skilled in the art, and do not constitute the essence of the invention.

While in accordance with the Patent Statutes only one best known embodiment of the invention has been illustrated and described in detail, it is to be particularly understood that the invention is not limited thereto or thereby, but that the inventive scope is defined in the appended claims.

What is claimed is:

1. A target edge tracking system which comprises
    means to generate a television video target signal representing at least one edge of the target for each raster,
    means to generate a variable repetitive target voltage waveform in synchronism with the video target signal,
    sample and hold discriminator means to receive the waveforms in synchronism, and the video target signal and detect the level of the waveform at the time of the video target signal, and produce a position voltage signal,
    means to compare the position voltage signal and the same repetitive target voltage waveform which was used to yield the position voltage to provide a tracking gate which follows the target edge position, means to update the output of the discriminator means for each raster producing a new video target signal which provides an instantaneous change of tracking gate position to follow the contour of target edge.

2. A system according to claim 1 which includes a duplicate system of the same elements to separately gate the other edge of the target.

3. A system according to claim 1 where the discriminator means includes a left edge time discriminator to generate a left edge discriminator level, and a right edge time discriminator to generate a right edge discriminator level, which system includes means to generate a yaw error signal by determining the average voltage between the left edge discriminator level and right edge discriminator level, and means to scale the signal and produce a yaw error correction signal.

4. A circuit according to claim 1 which includes a video amplifier and differentiator to provide voltage pulse levels indicative of left and right edges of the target, where the means to generate a target position variable repeditive voltage generates a waveform in the form of a sawtooth, a display generator to produce a composite video signal, means to gate the voltage pulses in accordance with the time discriminated comparison of the sawtooth waveform and the video pulse to drive the display generator and produce a gated composite video signal, and a means to average the left edge discriminator level with the right edge discriminator level to provide a yaw error signal based upon the position of both left and right edges of the target.

* * * * *